(12) United States Patent
Matecki et al.

(10) Patent No.: US 12,709,241 B2
(45) Date of Patent: Aug. 18, 2026

(54) VEHICLE REINFORCEMENT BEAM

(71) Applicant: Shape Corp., Grand Haven, MI (US)

(72) Inventors: Joseph R. Matecki, Allendale, MI (US); Jeffrey A. McHenry, Norton Shores, MI (US); Ed C. Pendergrass, West Olive, MI (US)

(73) Assignee: Shape Corp., Grand Haven, MI (US)

( * ) Notice: Subject to any disclaimer, the term of this patent is extended or adjusted under 35 U.S.C. 154(b) by 262 days.

(21) Appl. No.: 18/499,771

(22) Filed: Nov. 1, 2023

(65) Prior Publication Data

US 2024/0149816 A1 May 9, 2024

Related U.S. Application Data

(60) Provisional application No. 63/382,286, filed on Nov. 3, 2022.

(51) Int. Cl.
*B60R 19/18* (2006.01)
*B60R 19/34* (2006.01)

(52) U.S. Cl.
CPC .............. *B60R 19/18* (2013.01); *B60R 19/34* (2013.01); *B60R 2019/1813* (2013.01)

(58) Field of Classification Search
CPC ............ B60R 19/18; B60R 2019/1813; B60R 2019/1826
USPC .......................................................... 293/102
See application file for complete search history.

(56) References Cited

U.S. PATENT DOCUMENTS 5,722,708 A * 3/1998 Jonsson .................. B60R 19/18 293/122
6,059,331 A 5/2000 Mori
6,325,431 B1 * 12/2001 Ito ........................... B60R 19/18 293/121
7,537,252 B2 * 5/2009 Nagai ..................... B60R 19/18 293/142
8,746,761 B2 * 6/2014 Haneda ................... B60R 19/18 293/122
9,821,739 B2 11/2017 Yabu et al.
11,148,622 B2 * 10/2021 Brun ...................... B21D 53/88
12,296,767 B2 * 5/2025 Ono ........................ B60R 19/18
(Continued)

FOREIGN PATENT DOCUMENTS

JP 2001233147 A 8/2001
JP 2004237878 A 8/2004
(Continued)

OTHER PUBLICATIONS

International Search Report & Written Opinion for Application No. PCT/US2023/078367; mailed Feb. 26, 2024; 9 pp.

*Primary Examiner* — Gregory A Blankenship
(74) *Attorney, Agent, or Firm* — Bodman PLC

(57) ABSTRACT

A reinforcement beam for a vehicle has an outer beam and an inner beam. The outer beam spans laterally between crush cans of the vehicle. The outer beam forms an elongated hollow body that has a front wall and a rear wall extending along the length of the reinforcement beam. The inner beam is disposed along an intermediate section of the outer beam. The inner beam further includes an upper wall and a lower wall that each extend between the front wall and the rear wall of the outer beam. The front wall and the rear wall may include at least one rib that extends along the length of the outer beam.

22 Claims, 13 Drawing Sheets

(56) References Cited

U.S. PATENT DOCUMENTS

2001/0017473 A1* 8/2001 Yamamoto .............. B60R 19/18 293/122
2003/0227182 A1* 12/2003 Yoshida .................. B60R 19/18 293/102
2004/0262930 A1* 12/2004 Cumming ............... B60R 19/18 293/120
2010/0127519 A1* 5/2010 Wakabayashi .......... B60R 19/18 293/120
2011/0127783 A1* 6/2011 Shimotsu ................ B60R 19/18 293/132
2012/0306221 A1* 12/2012 Tsuyuzaki ............... B60R 19/18 293/102
2016/0144812 A1* 5/2016 Kaneko ................... B60R 19/22 293/102
2016/0280163 A1* 9/2016 Matecki ................ B60R 19/023
2017/0232917 A1 8/2017 Nakayama et al.
2018/0112298 A1* 4/2018 Weykamp ............... C22F 1/053
2020/0139910 A1* 5/2020 Maeda .................... B60R 19/18
2020/0164819 A1* 5/2020 Koga ...................... B60R 19/18
2022/0048454 A1 2/2022 Gibeau et al.
2022/0177034 A1* 6/2022 Sakaidani .............. B62D 21/15
2023/0143784 A1* 5/2023 Schiller ................... B60R 19/24 293/102
2024/0149816 A1* 5/2024 Matecki .................. B60R 19/34
2024/0399987 A1* 12/2024 Witte .................... B60R 19/023
2025/0196792 A1* 6/2025 Schiller ................... B60R 19/18

FOREIGN PATENT DOCUMENTS

JP 2016052859 A 4/2016
JP 2016199256 A 12/2016
JP 2017210227 A 11/2017
KR 20170027213 A 3/2017
WO 2016163054 A1 10/2016

* cited by examiner

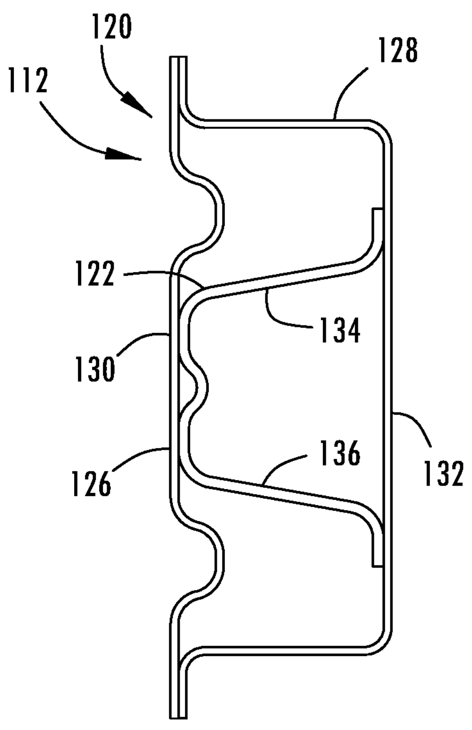
FIG. 8
220
228
212
222
234
230
236
232
226
FIG. 9
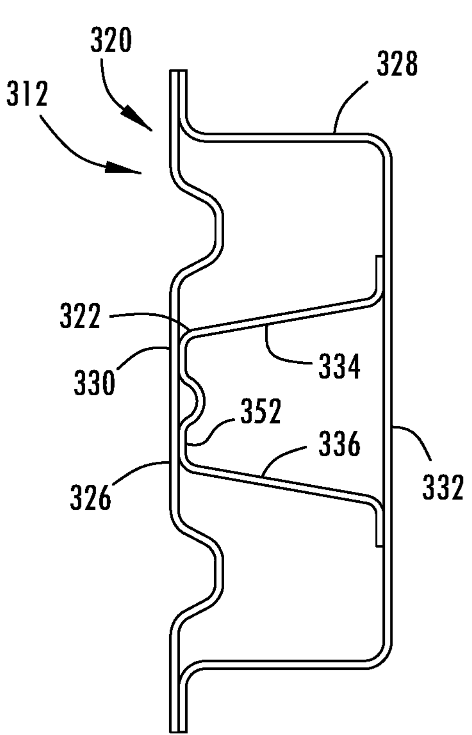
FIG. 10
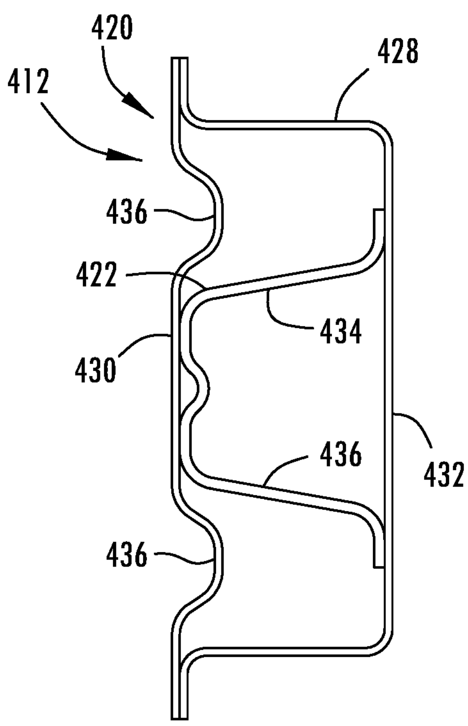
FIG. 11

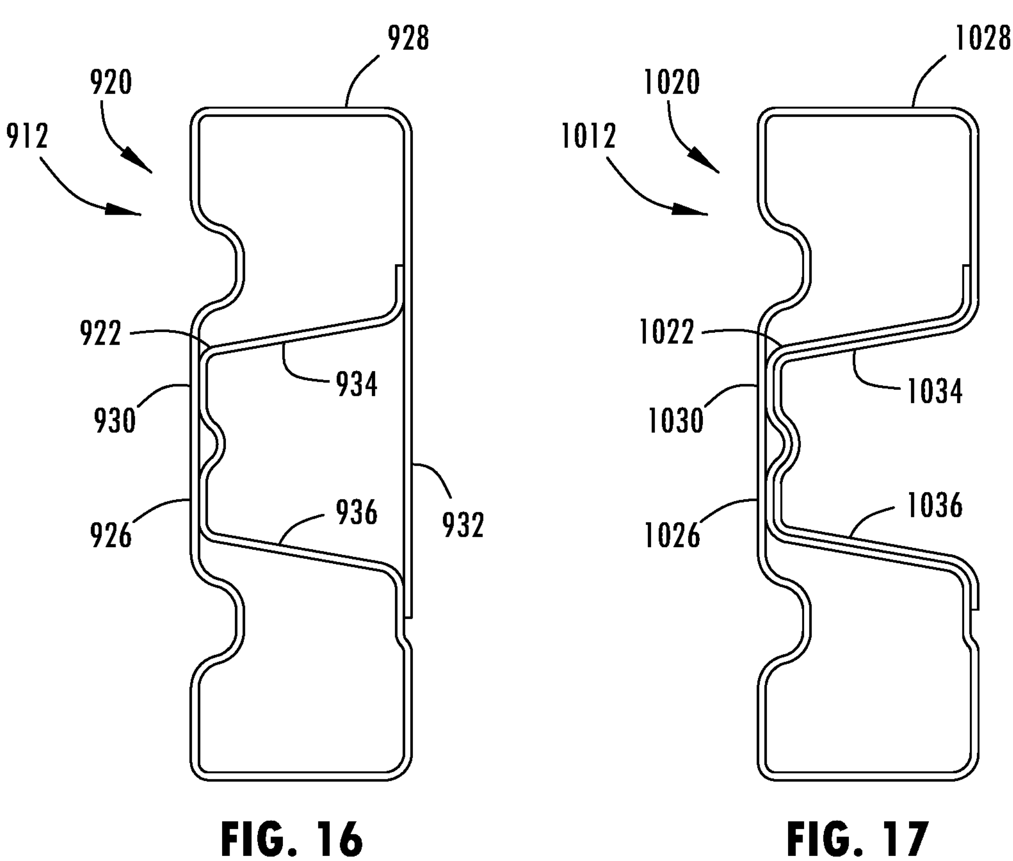
FIG. 16
FIG. 17
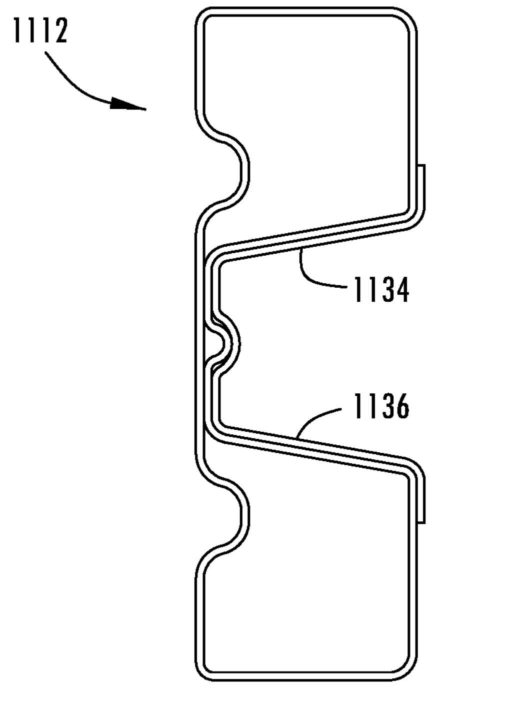
FIG. 18
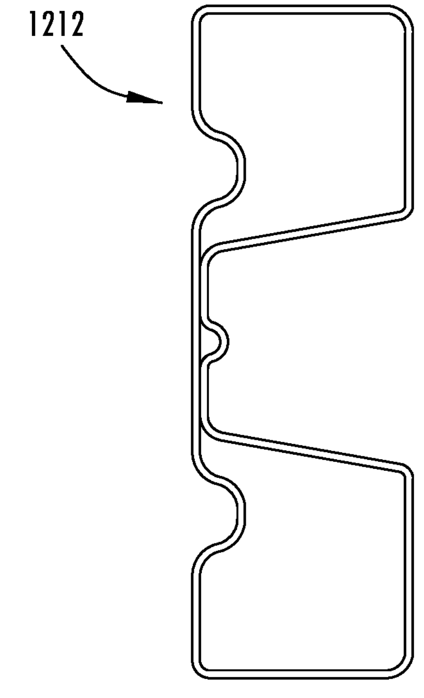
FIG. 19

VEHICLE REINFORCEMENT BEAM

CROSS-REFERENCE TO RELATED APPLICATION

This application claims the benefit and priority under 35 U.S.C. § 119(e) of U.S. provisional application Ser. No. 63/382,286, filed on Nov. 3, 2022, the content of which is incorporated herein by reference in its entirety.

TECHNICAL FIELD

The present disclosure relates generally to reinforcement beams for vehicles, such as bumper reinforcement beams for bumper assemblies, subassemblies, and components thereof.

BACKGROUND

Vehicle bumper systems commonly include at least one reinforcement beam that spans across the front or rear end of the vehicle. The primary reinforcement beam is typically supported by crush cans that attach to the vehicle frame structure. Vehicle bumper systems undergo rigorous testing for impact energy management and absorption from high speed and low speed crash impacts, such as to comply with mandated government regulations and insurance certifications. For example, impact requirements and protocols for bumper systems are set forth by the United States Federal Motor Vehicle Safety Standards (US FMVSS), the Insurance Institute for Highway Safety (IIHS), the National Highway Traffic Safety Administration (NHTSA), the European EC E42 consumer legislation, and the Asian Pedestrian Protection for lower and upper legs, among others. Bumper systems are also designed to maximize strength-to-weight ratios in an effort to minimize the overall vehicle weight, while balancing the cost of the associate bumper system components.

SUMMARY

This disclosure provides a reinforcement beam for a vehicle that functions to receive and absorb impact loads delivered by vehicle collisions, such as implementations of a bumper reinforcement beam that is supported by crush cans at a vehicle frame. The bumper reinforcement beam includes an outer beam component configured to span laterally between the crush cans and an inner beam component that reinforces a central or intermediate section of the outer beam component, such that the inner beam component is omitted at the end sections of the outer beam that are otherwise supported to a greater extent by the crush cans. The outer beam component has an elongated hollow body formed from a metal sheet material, such as a front sheet and a rear sheet that are attached together along respective upper and lower flanges. The inner beam reinforces a hollow area between the front wall and the rear wall of the outer beam by providing an upper wall and a lower wall that extend between the front and rear walls. The inner beam may have a greater bending strength than the outer beam, such as a result of forming the inner beam with a metal sheet having a greater thickness or tensile strength or the like.

One aspect of the disclosure provides a bumper reinforcement beam that is configured to be supported by crush cans at a vehicle frame. The bumper reinforcement beam includes an outer beam and an inner beam. The outer beam has an elongated hollow body formed from a metal sheet material and configured to span laterally between the crush cans. The hollow body includes a front wall and a rear wall extending along a length defined between a first end and a second end of the hollow body. The inner beam is disposed along an intermediate section of the outer beam, where the inner beam has an upper wall and a lower wall that each extend between the front wall and the rear wall of the outer beam.

The front wall and the rear wall of the outer beam may include at least one rib that extends along the length of the outer beam. The inner beam may have a length between its opposing ends that is less than a half of the length of the outer beam. The end sections of the outer beam that are disposed at opposing ends of the central section may be void of the inner beam. In some aspects, the inner beam may be formed from a metal sheet material that has a greater thickness than the metal sheet material of the outer beam, such as twice the thickness or more or less than the metal sheet material of the outer beam.

The inner beam may have an intermediate portion or connecting wall that interconnects between the upper wall and the lower wall to define a channel along the inner beam. The intermediate portion may have a groove that is formed along a forward surface of the inner beam. The intermediate portion of the inner beam may be coupled to the front wall of the outer beam.

The upper and lower walls of the inner beam may divide the interior volume of the hollow body to form a plurality of elongated hollow areas. In some examples, the inner beam has rear flanges that integrally extend from the upper and lower walls. The rear flanges may attach to the rear wall of the outer beam. The upper and lower walls of inner beam may extend rearward at an angle of less than 40 degrees relative to normal to a planar extent of the front wall. In certain aspects, the upper wall of inner beam extends rearward and upward at an angle of less than 20 degrees relative to normal to a planar extent of the front wall. In some aspects, the lower wall of inner beam extends rearward and downward at an angle of less than 20 degrees relative to normal to a planar extent of the front wall.

The front wall of the outer beam may have one or more ribs that extend along the length of the outer beam. In some examples, the outer beam includes a front piece that has the front wall and a rear piece that has the rear wall. The front and rear piece may attached together along respective upper and lower flanges to enclose a hollow interior of the outer beam. In some examples, the upper and lower flanges are each attached together via welding. The upper flanges of the front and rear pieces may protrude upward from a hollow interior of the hollow body. The lower flanges of the front and rear pieces may protrude downward from the hollow interior of the hollow body.

The front and rear pieces of the outer beam may each be formed from a separate metal sheet. In some aspects, the rear piece of the outer beam comprises an upper wall and a lower wall that together with the rear wall define a C-shaped cross section. A rear surface of the rear piece may include an attachment surface that is adapted for attachment to the crush cans.

Another aspect of the disclosure provides a bumper reinforcement beam that is configured to be supported by crush cans at a vehicle frame. The bumper reinforcement beam includes a front beam piece having a front wall and a rear beam piece having a rear wall. The upper and lower edges of the rear beam piece that are attached along respective upper and lower edges of the front beam piece to define an elongated hollow body having a length configured to span between crush cans. An inner beam piece is attached between the front and rear beam pieces and includes an upper wall and a lower wall that extends between the front wall and the rear wall. The inner beam piece has a length that is less than half the length of the elongated hollow body.

Yet another aspect of the disclosure provides a reinforcement beam for a vehicle, where the reinforcement beam has an outboard beam component and an inboard beam component. The outboard beam component includes an outboard wall and the inboard beam component includes an inboard wall. The inboard beam component also includes upper and lower flanges that are attached along respective upper and lower edges of the outboard beam component to define an elongated hollow body with a length defined between opposing ends of the outboard beam component. The inner beam component is attached between the outboard and inboard beam components and includes a C-shaped cross section defining an upper shear wall and a lower shear wall that each extend between the outboard wall and inboard wall. The inner beam component has a length that is less than half the length of the elongated hollow body.

Each of the above independent aspects of the present disclosure, and those aspects described in the detailed description below, may include any of the features, options, and possibilities set out in the present disclosure and figures, including those under the other independent aspects, and may also include any combination of any of the features, options, and possibilities set out in the present disclosure and figures.

The details of one or more implementations of the disclosure are set forth in the accompanying drawings and the description below. Other aspects, advantages, purposes, and features will be apparent upon review of the following specification in conjunction with the drawings.

BRIEF DESCRIPTION OF THE DRAWINGS

FIGS. 8-19 are cross-sectional side views of examples of reinforcement beams taken at intermediate sections of the length thereof.

Like reference numerals indicate like parts throughout the drawings.

DETAILED DESCRIPTION

Figure 1:
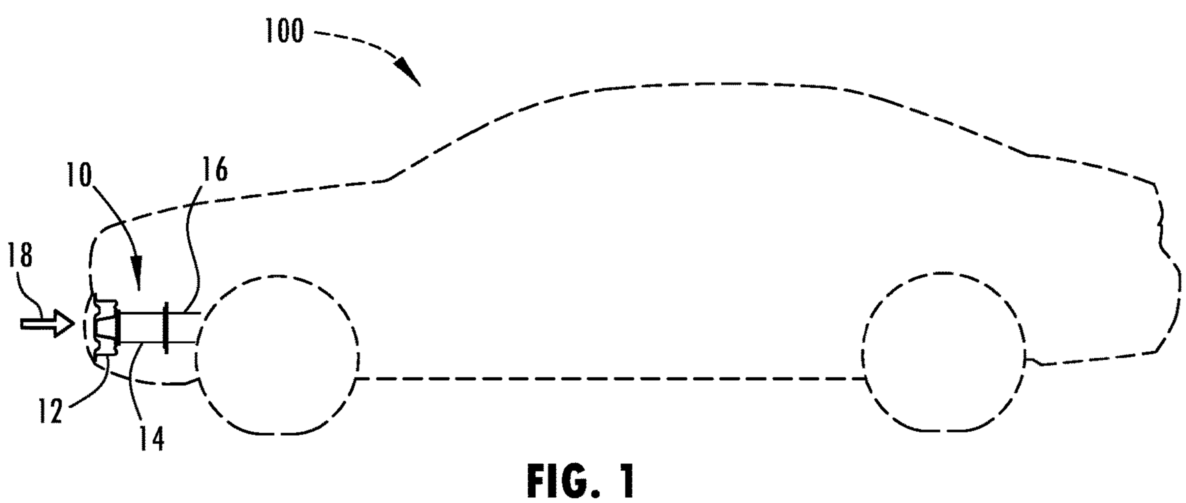
FIG. 1 is a side elevation view of a vehicle having a bumper assembly including a reinforcement beam.

Reinforcement beams for vehicles are disclosed herein in various implementations as impact energy absorption and management devices that are used in conjunction with other vehicle components to absorb and manage impact loads and energy, while minimizing damage and intrusion during an impact to the vehicle. For example, a reinforcement beam may be employed at a bumper assembly that is attached to a vehicle frame, where the reinforcement beam is a cross car structure supported by crush cans. In some instances, vehicle bumper assemblies can have increased front end stiffness and impact energy absorption requirements, such as on electric vehicles or rear engine mounted vehicles with greater vehicle mass and front ends that may be more susceptible to impact intrusion. While it is generally known that bumper reinforcement beams with increased mass can function to meet increased stiffness requirements, increasing mass typically adds to the vehicle cost while also reducing range and/or fuel efficiency.

The reinforcement beam 12 of the disclosure includes an outer beam component 20 and an inner beam component 22 that reinforces an intermediate section 24 (FIG. 3) of the outer beam component 20. The outer beam component 20 has an elongated hollow body, which may be formed from a metal sheet material. For example, as shown in FIG. 4A, the outer beam component 20, includes a front piece 26 and a rear piece 28 that may be attached together along their respective upper and lower edges 27, 29, such as along defined upper and lower flanges. The inner beam component 22 reinforces a hollow area between the front wall 30 and the rear wall 32 of the outer beam component 20 by providing an upper wall 34 and a lower wall 36 that each extend between the front and rear walls 30, 32.

As described here, reference to front and rear and other directional derivatives for this example of the reinforcement beam is in reference to its use on a front bumper assembly (FIG. 1) and its relative location on the associated vehicle 100. However, it is understood that the reinforcement beam disclosed herein may also be used on a rear bumper assembly 13 or a side frame structure 15 (FIG. 1A), such as a rocker or a battery tray side member, among other conceivable uses on a vehicle structure or subassembly to absorb and manage impact loads and energy.

Figure 1A:
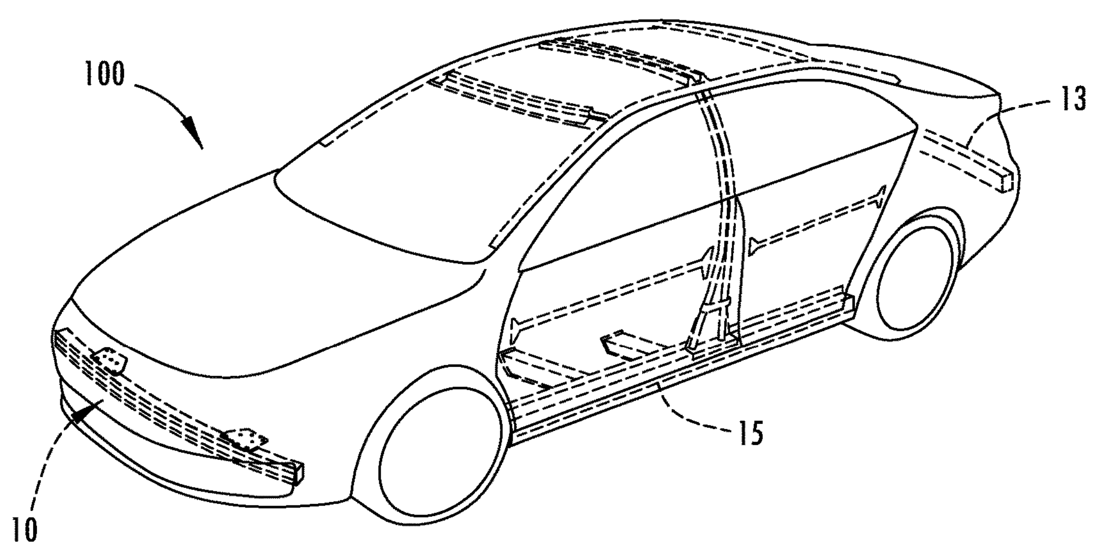
FIG. 1A is a perspective view of the vehicle of FIG. 1, showing various additional reinforcement beams.

Referring now to the drawings and the illustrative examples depicted therein, a bumper assembly 10 for a vehicle 100, such as shown in FIG. 1, has a bumper reinforcement beam 12 that is supported by crush cans 14 that are attached to the bumper reinforcement beam 12 at generally equal spacing from a center of the bumper reinforcement beam 12. The crush cans 14 of the bumper assembly 10 each mount to an end or tip of a frame rail 16 or other supportive portion of a vehicle frame to position the bumper reinforcement beam 12 so that it spans laterally (in a width direction of the vehicle) across a front end of the vehicle 100. As shown in FIG. 1, the bumper assembly 10 is mounted at the front end of the vehicle 100, which may be a passenger vehicle or other type of motor vehicle, such as a car, truck, bus, van, or sport utility vehicle or the like. The crush can 14 functions to support the bumper reinforcement beam 12 at the vehicle frame 16 and to direct and absorb impact loads 18 received (in a longitudinal or x-direction relative to the vehicle) from the supported bumper reinforcement beam 12 to the attached frame 16 through the crush can 14. It is also contemplated that the bumper assembly and other implementations thereof may be used or otherwise incorporated into a rear end or other areas of a vehicle. As shown in FIG. 1A, various reinforcement beams for a vehicle 100 are depicted therein in dashed lines. Implementations of the bumper assembly may be incorporated into other vehicle structural members such as those illustrated, including a rear bumper, roof rails, A-pillars, and B-pillars.

Figure 2:
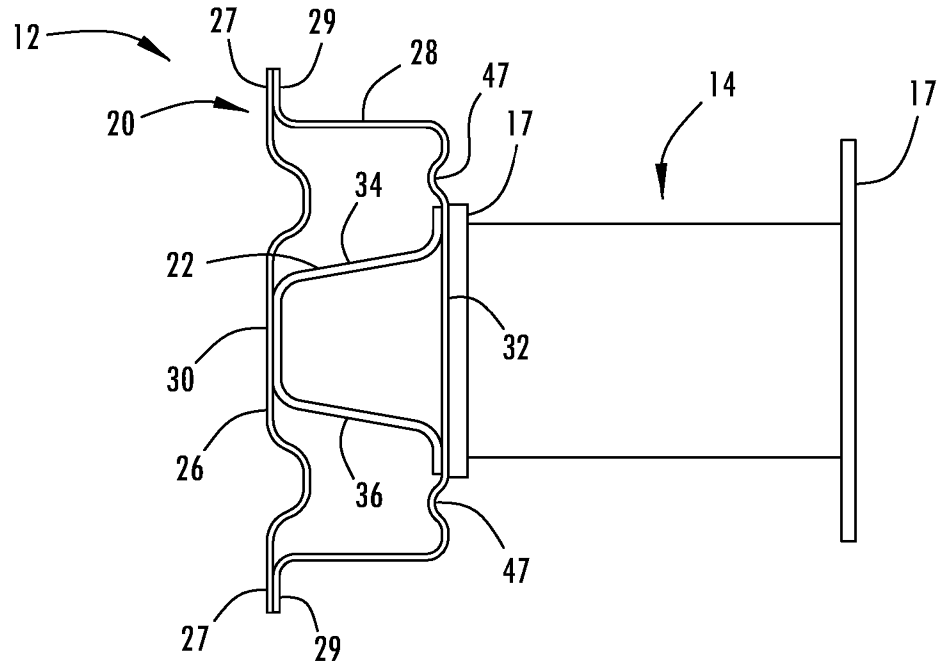
FIG. 2 is a side elevation view of the reinforcement beam and a supporting crush can of FIG. 1.

As shown for example in FIG. 2, a bumper reinforcement beam 12 and crush can 14 are illustrated. The crush can 14 is formed as a thin-walled, hollow structure that is a frangible structure designed to crush to absorb impact energy received at the bumper reinforcement beam 12. The bumper assembly 10 may include one or more attachment plates 17 between the crush can 14 and the bumper reinforcement beam 12 or between the crush can 14 and the vehicle frame component 16 (FIG. 1), or both. The one or more attachment plates 17 may include a distribution of apertures for attachment to the bumper reinforcement beam 12 or the vehicle frame component 16 with threaded or similar fasteners, such as bolts, rivets, or the like. The crush can 14 may be welded to the one or more attachment plates 17. Alternatively, the crush can 14 may be welded directly to the bumper reinforcement beam 12, or to the vehicle frame component 16, or both.

Figure 3:
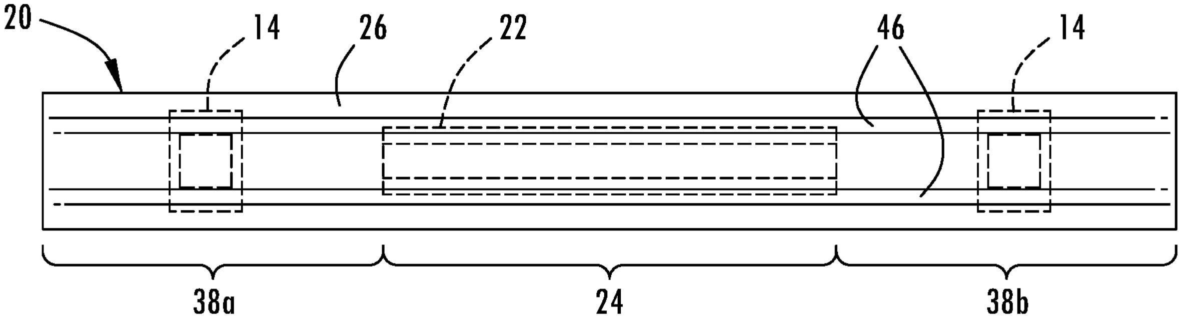
FIG. 3 is a front elevation view of the reinforcement beam of FIG. 2.
Figure 4A:
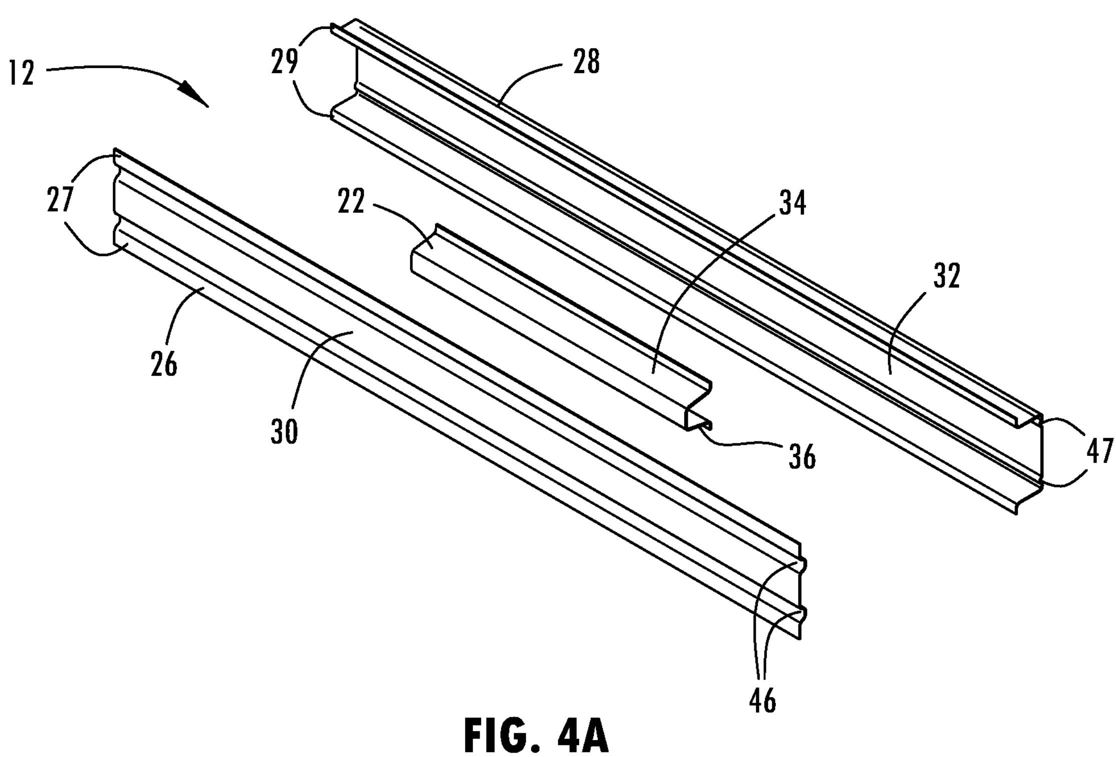
FIG. 4A is an exploded perspective view of the reinforcement beam shown in FIG. 2.

As further shown in FIGS. 2 and 3, the inner beam component 22 of the bumper reinforcement beam 12 reinforces an intermediate section 24 of the outer beam component 20. The intermediate section 24 may include a central section of the outer beam component 20 as shown in FIG. 3. In other examples, the intermediate section 24 may be off-center along the length of the outer beam component 20. As illustrated in FIG. 3, the intermediate section 24 may include one position along the length of the outer beam component 20, such that the bumper assembly 10 includes one inner beam component 22. In other examples, more than one intermediate section 24 and more than one inner beam component 22 may be included along the length of the outer beam component 20. By adding more than one inner beam component 22, the beam assembly 10 may drive buckle points to specific locations without the added support of the inner beam component 22. The inner beam component 22 has a length between its opposing ends that is less than a half of the length of the outer beam component 22. For example, the length of the outer beam component may be in a range approximately between 800 mm and 1,600 mm, or in a range between 1,000 mm and 1,250 mm, such as approximately 1,200 mm, and the length of the inner beam component may be in a range between approximately 300 mm and 600 mm, such approximately as 400 mm. In some examples, such as in bumper components extended for small overlap impact testing, the outer beam component may have a length in a range between 1,500 mm and 1,600 mm. These ranges are inclusive of the respective endpoints.

As shown in FIG. 3, the lateral end sections 38*a*, 38*b* of the outer beam component that are disposed at opposing ends of the central section 24 are void of the inner beam component 22. The lateral end sections 38*a*, 38*b*, however, undergo less bending stress than the central section 24 due to the support of the outer beam component 20 provided by the crush cans 14 at the lateral end sections 38*a*, 38*b*. Thus, the reinforcement provided by the inner beam component 22 is not provided at the lateral end sections 38*a*, 38*b*. It is understood that the reinforcement beam may be longer in additional examples and that the impact location may vary from a central section, such as in other implementations on the vehicle.

Figure 4B:
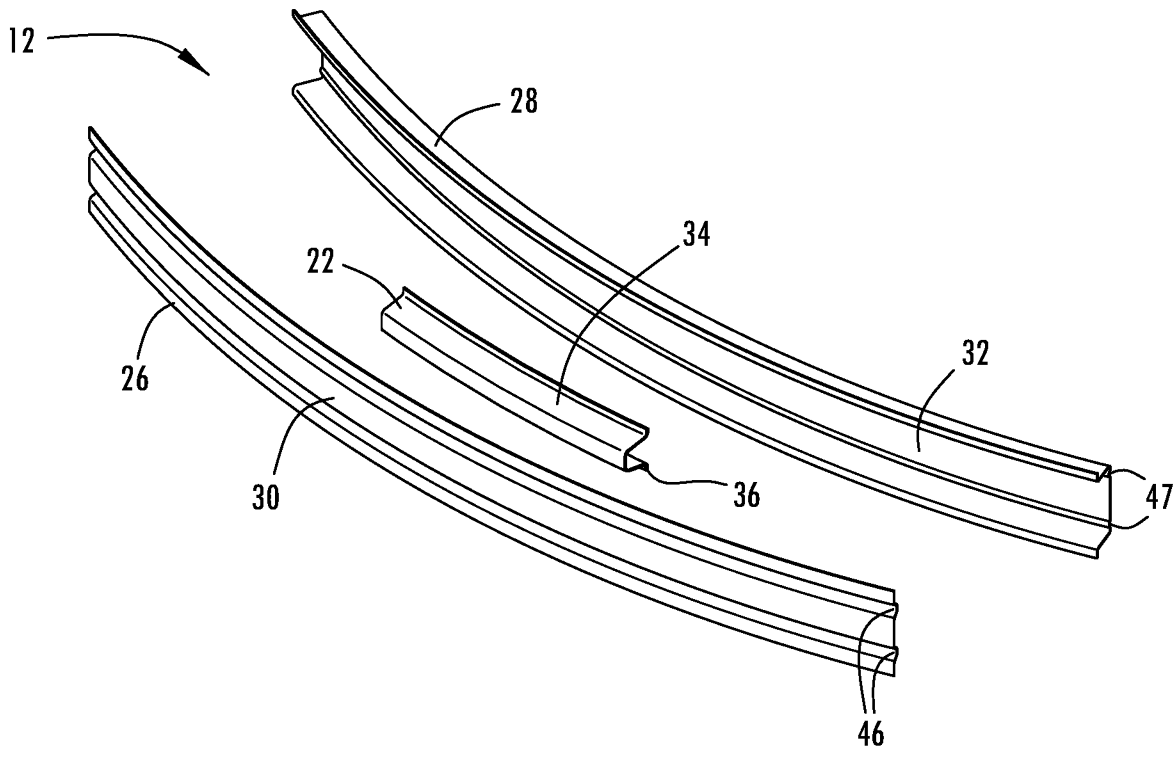
FIG. 4B is an exploded perspective view of an additional example of a reinforcement beam.

As illustrated in FIG. 4A, the bumper reinforcement beam 12 includes a generally straight shape along the length of the beam 12. Each of the beam components forming the reinforcement beam 12 has a corresponding straight shape to provide secure mating of the components together along the length of the beam. In other examples as shown in FIG. 4B, the bumper reinforcement beam 12 includes a curved shape or sweep that is imparted along the length of the beam 12. Such a curved shape or sweep may generally conform the beam to the package space permitted by the vehicle design. The curved shape may have a consistent radius of curvature along the length of the bumper reinforcement beam, such as shown in FIG. 4B, or in additional examples may have a varied radius of curvature at different sections of the length, such as a greater curvature (and effectively a smaller radius of curvature) at the lateral end sections of the beam. As further illustrated in FIG. 4B, each of the beam components forming the bumper reinforcement beam 12 have a corresponding curved shape so as to provide a secure mating of the components together on the length of the reinforcement beam. The corresponding curved shape between the beam components shown in FIG. 4B is provided by the same or substantially similar radius of curvature for each beam component.

Figure 5:
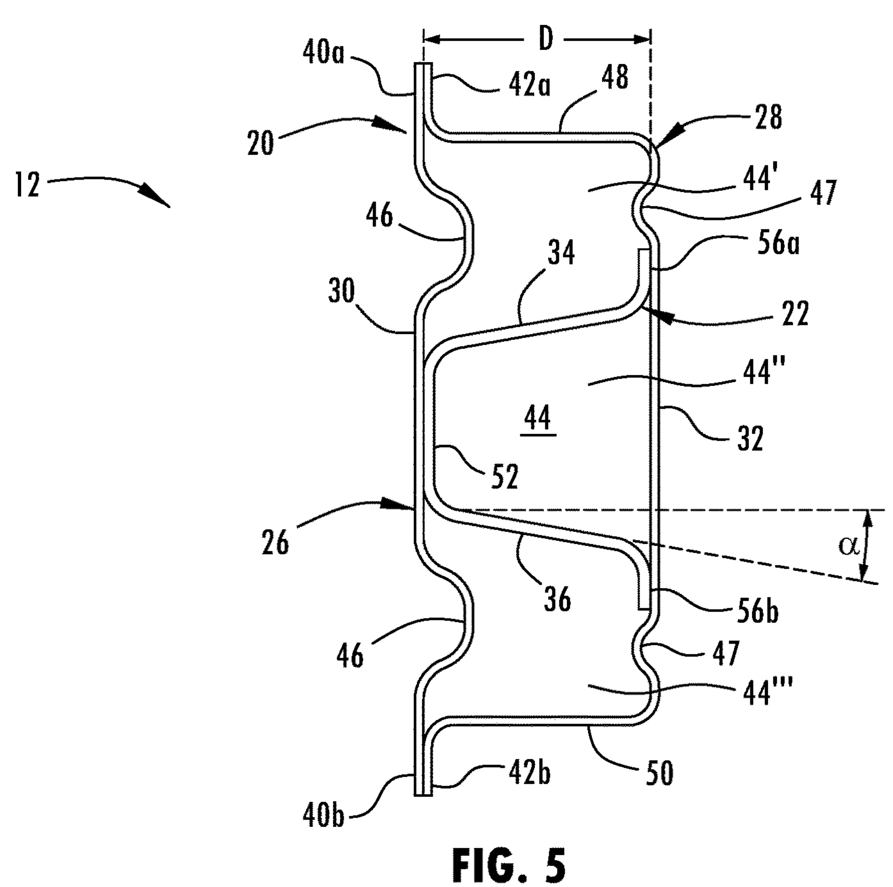
FIG. 5 is a side elevation view of the reinforcement beam of FIG. 2.
Figure 6:
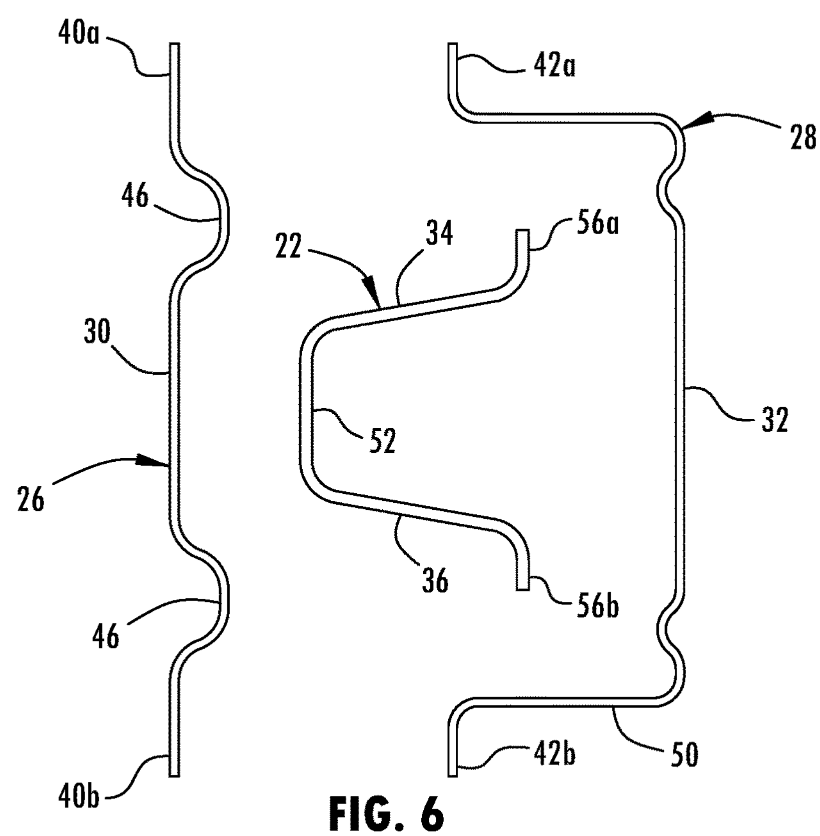
FIG. 6 is an exploded side elevation view of the reinforcement beam of FIG. 2.

As illustrated in the example in FIGS. 5 and 6, the outer beam component 20 has an elongated hollow body formed from a metal sheet material, such as a front sheet or piece 26 and a rear sheet or piece 28 that are attached together. In other words, the front piece 26 of the outer beam component 20 is an outboard beam component 26 and the rear piece 28 is an inboard beam component 28. The front and rear pieces 26, 28 are coupled together at their respective upper flanges 40*a*, 42*a* and lower flanges 40*b*, 42*b*. The front and rear pieces 26, 28 may be coupled, for example, directly or indirectly through mechanical joining such as via welding adhesive, or the like. As shown in FIG. 5, the front piece 26 has an upper flange 40*a* extending upward beyond the hollow interior area 44 defined by the outer beam component 20 and a lower flange 40*b* extending downward beyond the hollow interior area 44 defined by the outer beam component 20. The upper and lower flanges 40*a*, 40*b* of the front piece 26 extend vertically in planar extension of the front wall 30 of the front piece.

As also shown in FIG. 5, the rear piece 28 has an upper flange 42*a* extending upward beyond the hollow interior area 44 defined by the outer beam component 20 and a lower flange 42*b* extending downward beyond the hollow interior area 44 defined by the outer beam component 20. The upper and lower flanges 42*a*, 42*b* of the front piece 26 also extend vertically so as to position a forward mating surface to receive a rear mating surface of the upper and lower flanges 40*a*, 40*b* of the front piece 26. The upper flanges 40*a*, 42*a* and the lower flanges 40*b*, 42*b* engage together to form a flange connection with the sheets overlapping at the upper and lower front corners of the outer beam component 20, protruding vertically above and below the hollow interior area 44 enclosed by the outer beam component 20.

The rear piece 28 of the outer beam component 20, as shown in FIG. 5, includes an upper wall 48 and a lower wall 50 that together with the rear wall 32 define a C-shaped cross section. The upper flange 42*a* of the rear piece 28 integrally extends upward from the forward portion of the upper wall 48. Likewise, the lower flange 42*b* of the rear piece 28 integrally extends downward from the forward portion of the lower wall 50. Accordingly, the example shown in FIG. 5 provides a depth D to the outer beam component 20 of the overall reinforcement beam 12 that that is defined by the length of the upper and lower walls 48, 50 of the outer beam component 20. The depth D of the section is constant along the length of the reinforcement beam 12 and is generally proportional to the other features. In the example shown, the depth is approximately 40 mm and in additional examples may be between 50 mm and 70 mm or more or less. The rear wall 32 of the outer beam component 20 shown in FIGS. 5 and 6 has two rear ribs 47 that extend along the length of the outer beam component. In additional examples, there may be more or fewer rear ribs and the rear ribs may have different shapes, dimensions, and positions on the rear wall. Also, the rear ribs 47 have a height vertically on the rear face and depth forward from the rear face of the rear wall 32 that is configured to allow the sheet material to be formed inward in a generally curved shape without exceeding the allowable curvature (minimum capable bending radius) of the sheet material without failure. The rear ribs 47 provide additional stiffness to the rear wall 32. In other examples, the rear wall 32 is void of rear ribs 47 (FIG. 8). For example, the beam assembly may have a height of less than 80 mm. In some instances, the rear ribs 47 may not be provided.

Referring again to the front piece 26, the front wall 30 of the outer beam component 20 shown in FIGS. 5 and 6 has two front ribs 46 that extend along the length of the outer beam component. In additional examples, there may be more or fewer front ribs and the front ribs may have different shapes, dimensions, and positions on the front wall. Also, the front ribs 46 have a height vertically on the front face and depth rearward from the front face of the front wall 30 that is configured to allow the sheet material to be formed inward in a generally curved shape without exceeding the allowable curvature (minimum capable bending radius) of the sheet material without failure. The front ribs 46 provide additional stiffness to the front wall.

The metal sheet material of the outer beam component can comprise of any metals or metal alloys that have the desired characteristics, such as stiffness, tensile strength, and the like. For example, the material may include aluminum or steel, such as a high strength or ultra-high strength steel, as well as combinations of other related metals in different alloys. For example, an ultra-high strength steel is one with an ultimate tensile strength of greater than 780 MPa, or in some examples greater than 1,000 MPa. The sheet material of the outer beam component may be formed in various processes, such as with the use of cold stamping, roll forming, roll stamping, hot stamping, press brake bending, or combinations thereof.

As further shown in FIGS. 5 and 6, the inner beam component 22 is provided to reinforce the hollow area 44 between the front wall 30 and the rear wall 32 of the outer beam component 20 by providing an upper wall 34 and a lower wall 36 that extend between the front and rear walls 30, 32. The upper and lower walls may also be referred to as shear walls and may be configured to undergo axial loading from impact forces to the bumper system. The inner beam component 22 may have a greater bending strength than the outer beam component 20, such as a result, at least in part, of forming the inner beam with a metal sheet having a greater thickness. For example, the inner beam component 22 may be formed from a different metal sheet material having a greater thickness than the metal sheet material of the outer beam, such as twice the thickness or more or less. In the example shown in FIG. 5, the thickness of the metal sheet forming the inner beam component 22 is approximately 2 mm and the thickness of the metal sheet forming the outer beam component 20 is approximately 1 mm. As such, the thickness of the metal sheet forming the inner beam component may be 2 times or 2.5 time or greater that of the outer beam component. In additional examples, the inner beam component has a thickness greater than 1.2 mm, or greater than 1.5 mm, or greater than 1.8 mm.

The inner beam component 22, as shown in FIGS. 5 and 6, has an intermediate portion or connecting wall 52 that integrally interconnects between the upper wall 34 and the lower wall 36 to define a channel or C-shape along the inner beam component 22. As shown in FIG. 5, the intermediate portion 52 has a planar shape that abuts the inner surface of the outer beam component 20 to provide an interfacing surface area. The intermediate portion 52 of the inner beam may be attached to the front wall 30 of the outer beam component 20, such as via adhesive, welding, fasteners, or the like. Also, in some instances, the intermediate portion 52 of the inner beam may contact the front wall 30 of the outer beam component 20 without any positive attachment. In additional examples, such as shown in FIG. 8, the intermediate portion 152 may have a groove 154 that is formed along a forward surface of the inner beam component 22 (FIG. 8). The groove 154, like the ribs on the front wall, can also provide additional stiffness and support to the front portion of the bumper reinforcement beam.

The upper and lower walls 34, 36 of the inner beam component 22 may divide the hollow interior area 44 of the hollow body formed by the outer beam component 20 to form a plurality of elongated hollow areas 44', 44'', 44''' (FIG. 5). In doing so, the height of the intermediate portion 52 of the inner beam component 22 is configured for the ribs 46 in the front wall 30 to be generally centered over the respective upper and lower hollow areas 44', 44'. The upper and lower walls 34, 36 of the inner beam component 22 extend rearward at an angle α relative to normal or perpendicular to the planar extent or vertical orientation of the front wall 30, or in some examples the angle α is defined as relative to a generally horizontal plane. In some examples, the angle α is less than 40 degrees and preferably between −5 and 20 degrees. In other examples, the angle α for the upper wall of inner beam extends rearward and upward at less than 20 degrees relative to normal to a planar extent of the front wall. In some examples, the angle α for the lower wall of inner beam extends rearward and downward at an angle of less than 20 degrees relative to normal to a planar extent of the front wall. It is also contemplated that the angle may be 12 degrees, between 10 and 12 degrees, between 8 and 12 degrees, between 5 and 15 degrees, between 0 and 15 degrees, or between −5 and 20 degrees. In examples with rear ribs 47 positioned on the rear wall 32, the angle α may be between 8 and 12 degrees. For example, the angle α may be 10 degrees when rear ribs 47 are included. In examples where the rear wall 32 is void of rear ribs 47, the angle α may be larger, such as 20 degrees.

Further, as shown in FIGS. 5 and 6, the inner beam component 22 has rear flanges 56*a*, 56*b* that integrally extend from the upper and lower walls 34, 36. As shown in FIG. 5, the upper rear flange 56*a* extends upward from the upper wall 34 and the lower rear flange 56*b* extends downward from the lower wall 36. In some examples, the rear flanges 56*a*, 56*b* are coupled to the rear wall 32 of the outer beam component 20, such as via welding, adhesive, fasteners, or the like. In other example, the rear flanges are not coupled to the rear wall 32. In some instances, the upper rear flange 56*a* and the lower rear flange 56*b* extend to a position adjacent to the rear ribs 47 of the rear wall 32. In such position, the rear ribs 47 may be configured to retain the upper and lower flanges 56*a*, 56*b*, such as to prevent vertical movement of the inner beam component 22 relative to the outer beam component 20 within the hollow interior area 44.

While the thickness may be greater than the sheet material of the outer beam component 20, the metal sheet material of the inner beam component 22 can comprise the same metal, such as any metals or metal alloys that have the desired characteristics, such as stiffness, tensile strength, and the like. For example, the material may include aluminum or steel, such as a high strength or ultra-high strength steel, as well as combinations of other related metals in different alloys. Also, in other examples, the sheet material of the inner beam component may include a greater stiffness than the outer beam component, such as with a small, equal, or larger thickness. Further, the sheet material of the inner beam component 22 can also be formed in various processes, such as with the use of cold stamping, roll forming, roll stamping, hot stamping, press brake bending, or combinations thereof.

In addition, or in the alternative, the inner beam component 22 may be entirely or partially made of a non-sheet material, such as an injection molded polymer or composite, an aluminum extrusion, or a composite pultrusion, or the like. With the incorporation of such an alternative material structure for the inner beam component 22, the geometry may also be different from the geometry of the inner beam component 22 shown in FIGS. 5 and 6. In such further alternatives, the inner beam component 22 or features thereof may be formed via machining, molding, or other process suitable to the material selected for forming the alternative material.

Figure 7:
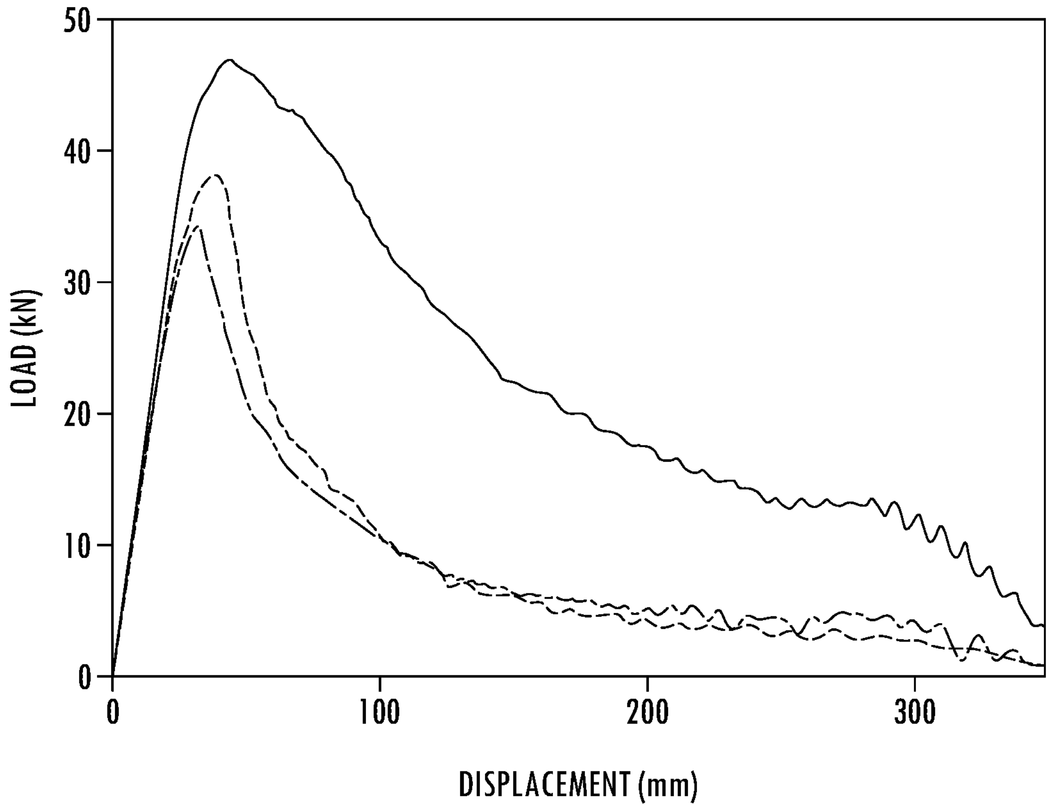
FIG. 7 is a graph showing experimental test results of the reinforcement beam shown in FIG. 8 under impact load conditions in comparison to prior reinforcement beams in dashed lines.

Referring now to FIG. 7, simulated experimental test results are illustrated showing the rearward displacement of the bumper reinforcement beam 12 in millimeters (mm) upon the application of increasing force load when undergoing a center pole impact test. The graph in FIG. 7 illustrates the results of a simulated test where the bumper reinforcement beam 12 illustrated in FIG. 8 is compared to known bumper reinforcement beam designs that are proportioned to have the same mass as the tested bumper reinforcement beam. The results show an increase in strength of 36% (at peak loading) and an increase in energy absorption of 92% after displacement of 100 mm. To obtain a similar level of performance, the other bumper reinforcement beam designs would generally need to have an additional mass of approximately 25%.

Additional examples of reinforcement beams are illustrated in FIGS. 8-20, showing various alternative features and variations from the reinforcement beam shown in FIGS. 5 and 6. For example, FIGS. 8 and 9 illustrate reinforcement beams 112, 212 with alternative rib structures as described above. For instance, FIG. 8 illustrates a reinforcement beam 112 with an outer beam component 120 having a rear piece 128 void of rear ribs to form a substantially planar rear wall 132 and a front piece 126 having a front wall 130. FIG. 8 also illustrates the inner beam component 122 including the groove 154 positioned on an intermediate portion or connecting wall 152 interconnected between the top wall 134 and the bottom wall 136.

FIG. 9 illustrates the reinforcement beam 212 provided with an outer beam component 220 having a front piece 226 without ribs, so as to form a substantially planar front wall 230, although it may have a curved shape or sweep along its length. The outer beam component includes a rear piece 228 without ribs, so as to form a substantially planar rear wall 232. The inner beam component 222 includes a groove 254 positioned on an intermediate portion or connecting wall 252 interconnected between the top wall 234 and the lower wall 236.

In the example shown in FIG. 10, the reinforcement beam 312 has a common sheet thickness for the pieces of the outer beam component 320 and the inner beam component 322. With a small sheet thickness for the inner beam component 322, the upper and lower walls 334, 336 are closer together, and the transition bends at the forward portion of the upper and lower walls can have a smaller radius of curvature and thereby a shorter height at the intermediate portion 352. In the illustrated example, the outer beam component 322 includes a rear piece 328 without ribs, so as to form a substantially planar rear wall 332 and a front piece 326 with ribs forming a front wall 330.

Similarly, in the example shown in FIG. 11, the reinforcement beam 412 has a common sheet thickness, but instead of 1 mm as shown in FIG. 10, the reinforcement beam 412 has a thickness of 2 mm which results in forming larger heights of the ribs 446 on the front wall 430 without exceeding the allowable curvature (minimum capable bending radius) of the sheet material without failure. In the illustrated example, the outer beam component 422 includes a rear piece 428 without ribs, so as to form a substantially planar rear wall 432 and a front piece 426 with ribs forming a front wall 430.

Figure 12:
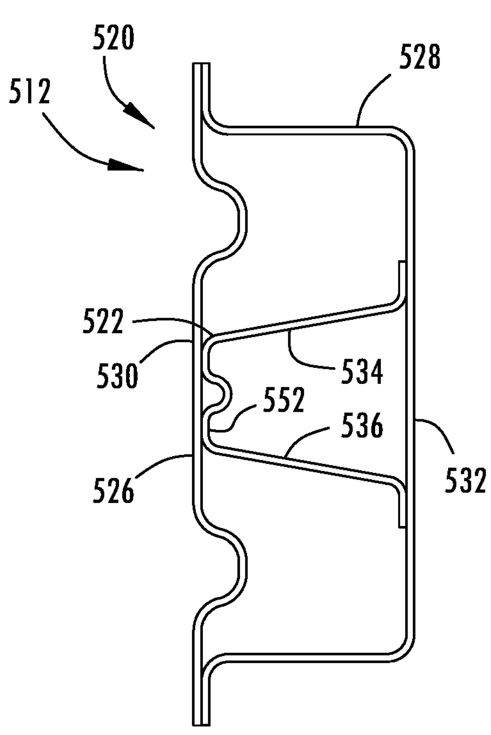

As shown in FIGS. 12, the inner beam component 522 of the reinforcement beam 512 is similarly reduced in height to the example shown in FIG. 10, but to a greater degree. This shorter height of the inner beam component 522 is again attributable to the inner beam component having a thinner sheet material with, in turn, a greater degree of bending. In the illustrated example, the outer beam component 522 includes a rear piece 528 without ribs, so as to form a substantially planar rear wall 532 and a front piece 526 with ribs forming a front wall 530.

Figure 13:
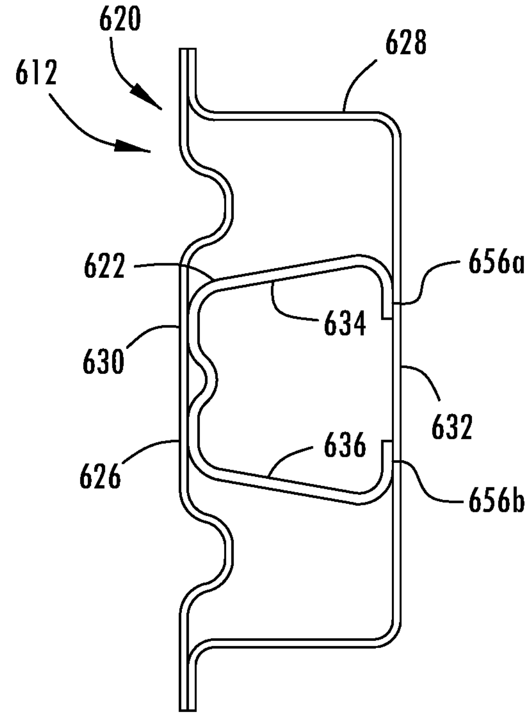

The example shown in FIG. 13, alters the inner beam component 622 from the reinforcement beam shown in FIGS. 5 and 6 by reversing the rear flanges 656*a*, 656*b* that integrally extend from the upper and lower walls 634, 636. As shown in FIG. 13, the upper rear flange 656*a* extends downward from the upper wall 634 and the lower rear flange 656*b* extends upward from the lower wall 636. In the illustrated example, the outer beam component 622 includes a rear piece 628 without ribs, so as to form a substantially planar rear wall 632 and a front piece 626 with ribs forming a front wall 630.

Figure 14:
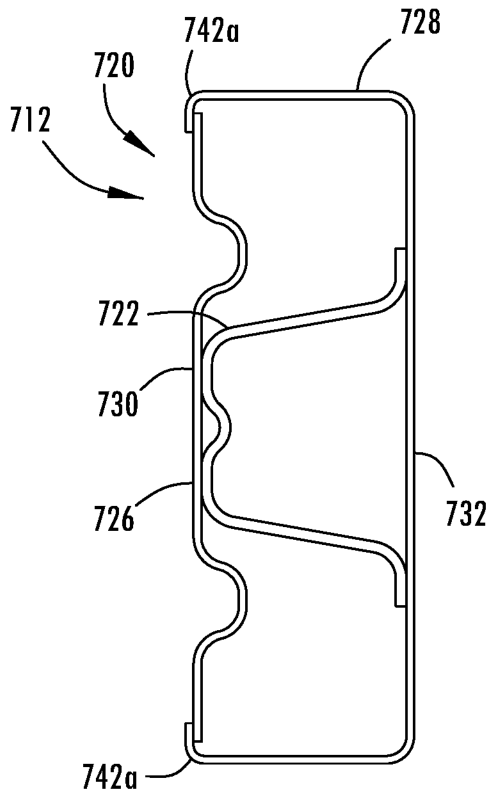
Figure 15:
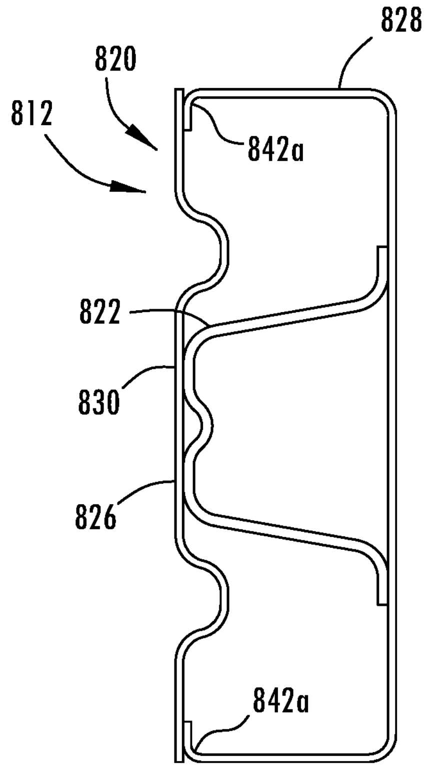

With reference to the examples of the reinforcement beams 712, 812 shown in FIGS. 14 and 15, these each shorten the height of the front wall 730, 830 by eliminating the upper and lower flanges extending beyond the profile of the hollow interior area. Instead, the front piece 726, 826 is coupled to the rear piece 728, 828 of the outer beam component 720, 820 by attaching the upper and lower edges of the front piece 726, 826 to inward protruding front flanges 742*a*, 842*a* on the rear piece 728, 828. Specifically, as shown in FIG. 14, the front piece 726 is attached to the rear-facing surface of the front flanges 742*a* of the rear piece 728. Alternatively, as shown in FIG. 15, the front piece 826 is attached to the front-facing surface of the front flanges 842*a*, 842*b* of the rear piece 328.

Further examples of the reinforcement beam are shown in FIGS. 16-19 that integrate and eliminate different walls, such as by using a single sheet that is roll formed or otherwise bent to form such different shapes. As shown in FIGS. 16 and 17, a single sheet is used to bend the reinforcement, such that the upper and lower walls of the inner beam component are integrally part of the same metal sheet as the outer beam component. Specifically, in FIG. 16, the reinforcement beam 912 includes an outer portion 920 having a rear piece 928 which forms a generally c-shaped component. The rear piece 928 is void of ribs to form a substantially planar rear wall 932. The outer portion 920 includes a front piece 926 including a front wall 930 which includes ribs. The sheet that defines the outer beam component 920 further defines the inner beam component 922. The inner portion 922 extends inward in front of the rear wall 932 portion and includes a top wall 934 and a rear wall 936 which extend between the front wall 930 and the rear wall 932 of the outer portion 920.

Similarly to FIG. 17, a single sheet is used to define both the outer portion 1020 and the inner portion 1022 of the reinforcement beam 1012. Instead, however, the outer portion 1020 includes a rear piece 1028 further including a rear wall, which includes a central rib 1032 that follows the C-shape of the inner portion 1022, specifically following the top wall 1034 and the lower wall 1036 of the inner portion 1022.

In FIG. 18, the reinforcement beam 1112 includes an inner beam component 1122 configured as a separate piece and provided as a rear reinforcement along portions of the upper and lower walls 1134, 1136 of a rear wall rib 1132. Similarly and as illustrated in FIG. 19, a reinforcement beam 1212 may include the outer beam component used along without the inner beam component 1122 of FIG. 18.

Figure 20:
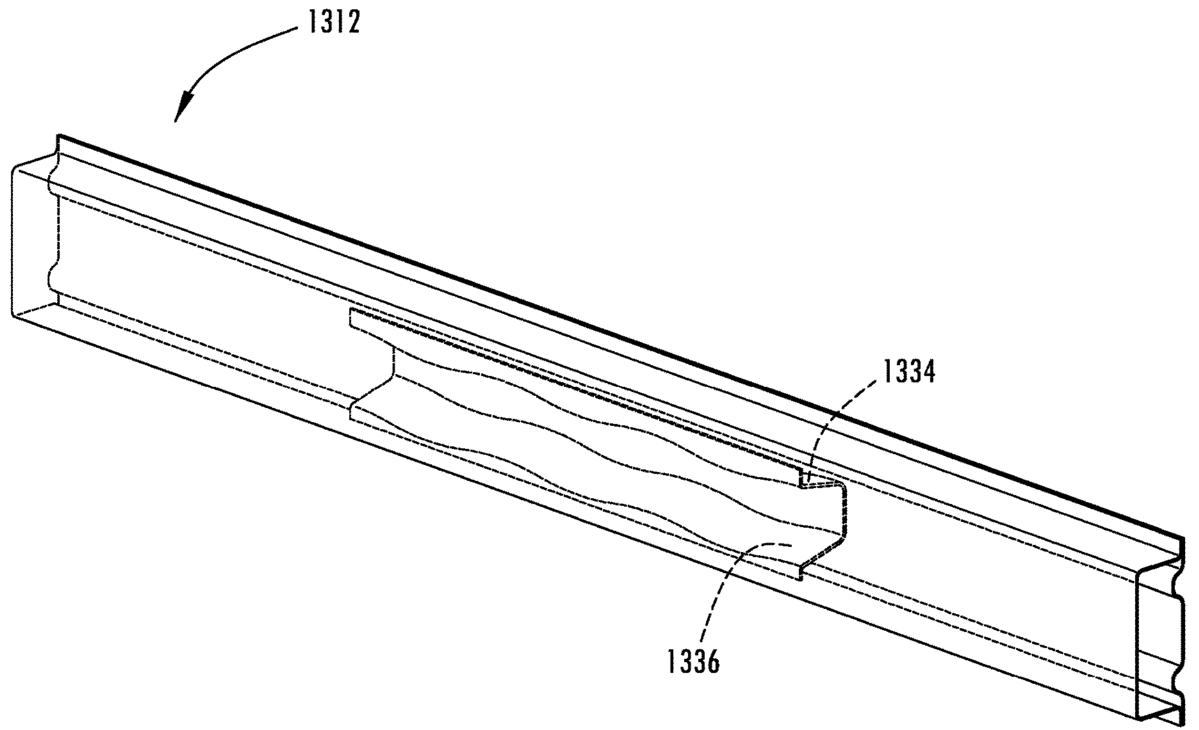
FIG. 20 is perspective view of an additional example of a reinforcement beam.

In yet another example as shown in FIG. 20, the reinforcement beam 1312 may also include an inner beam component 1322 that has a wave shape along its length, with the wave shape being formed in the upper and lower walls 1334, 1336 in the z-direction. Such wave shape formations may provide increased stability along the upper and lower walls in undergoing stress and receiving impact loads.

Figure 21:
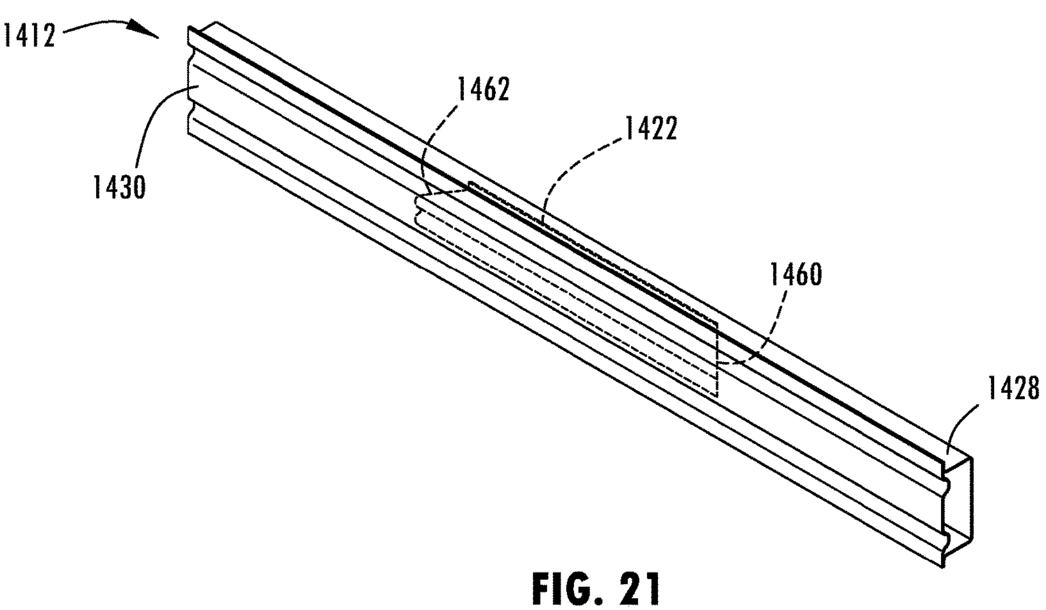
FIG. 21 is a perspective view of an additional example of a reinforcement beam.
Figure 22:
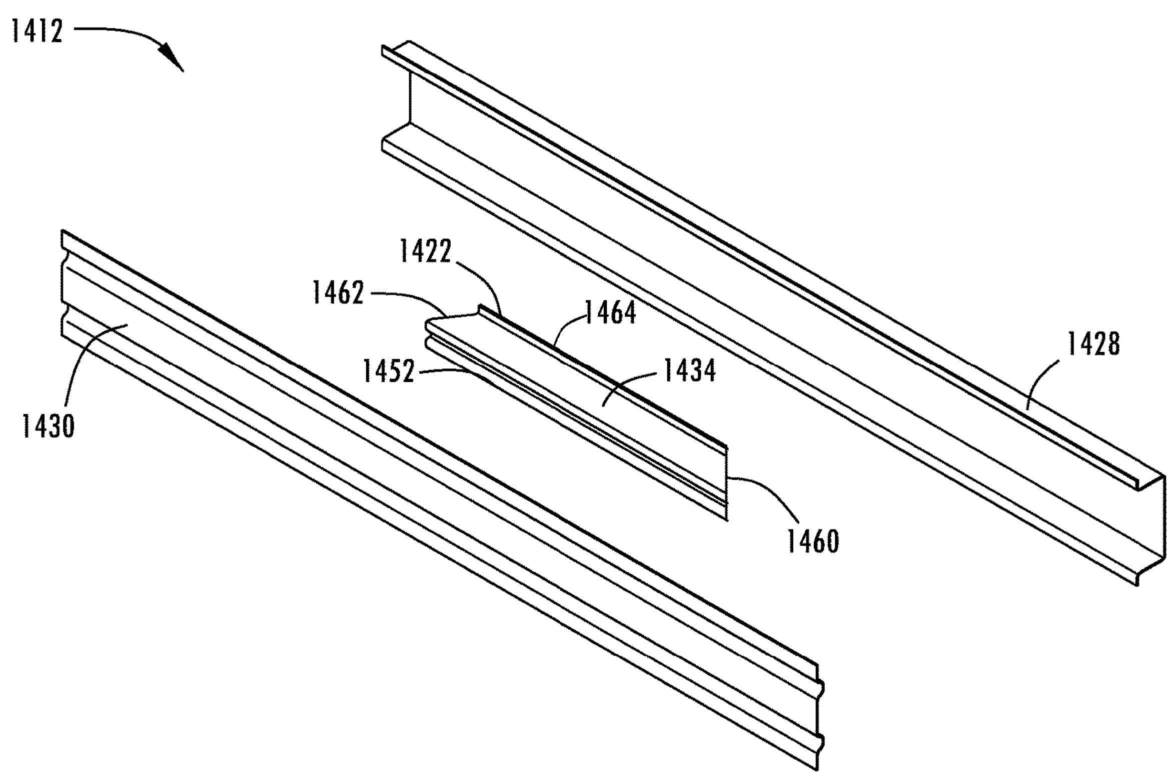
FIG. 22 is an exploded perspective view of the reinforcement beam of FIG. 21.
Figure 23:
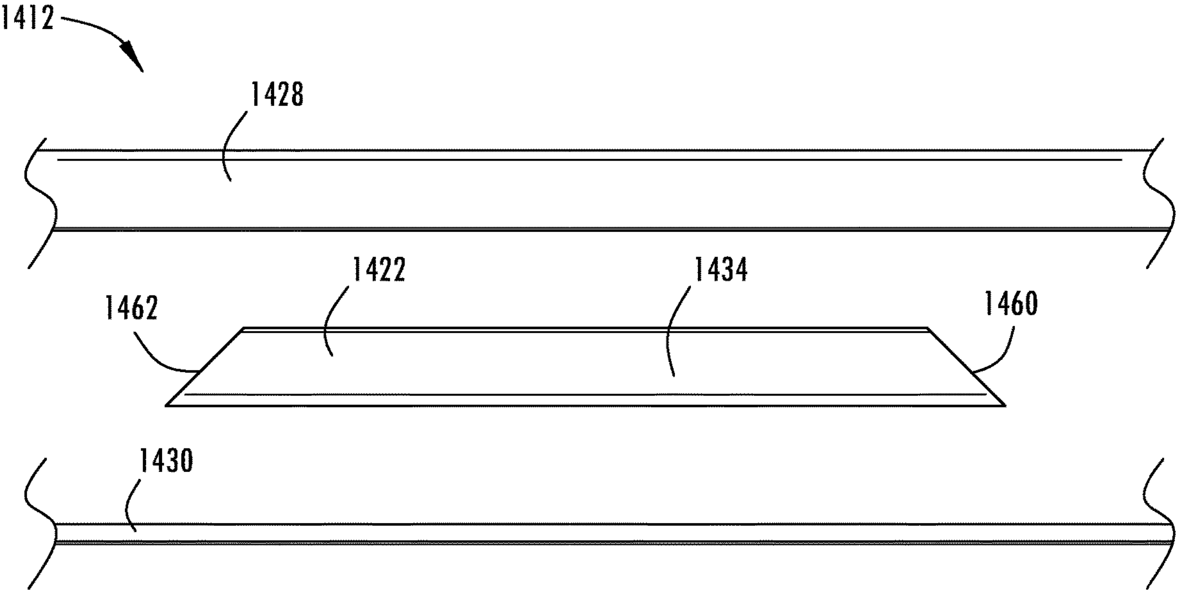
FIG. 23 is an exploded side elevation view of the reinforcement beam of FIG. 21.

In another example as shown in FIGS. 21-23, the reinforcement beam 1412 includes an inner beam component 1422 that has tapered ends 1460, 1462. The inner beam 1422 includes a front facing side 1452 or intermediate or connecting wall that connects the upper wall 1434 and the lower wall 1436. The front facing side 1452 runs adjacent to and generally parallel to the front wall 1430 of the outer beam. The inner beam 1422 also includes a rear facing side 1464 that generally includes the rear most portion of the upper wall 1434 and the lower wall 1436. The front facing side 1452 has a length longer than a length of the rear facing side 1464. The tapered ends 1460, 1462 connect the ends of the front facing side 1452 to the respective ends of the rear facing side 1464 of the inner beam component 1422 defining a tapered shape due to the difference in the length. As shown in FIG. 23, the tapered ends 1460, 1462 are angled at approximately 45 degrees relative to the front wall 1430, such that the front facing side 1452 has a longer length than the rear facing side 1464. The tapered shape of the ends 1460, 1462 may provide a gradual reduction in stress concentration upon impact and a reduction in strength at the ends of the inner beam component 1422. A gradual reduction in strength may provide increased stability along the beam 1412 in undergoing stress and receiving impact loads.

Figure 24:
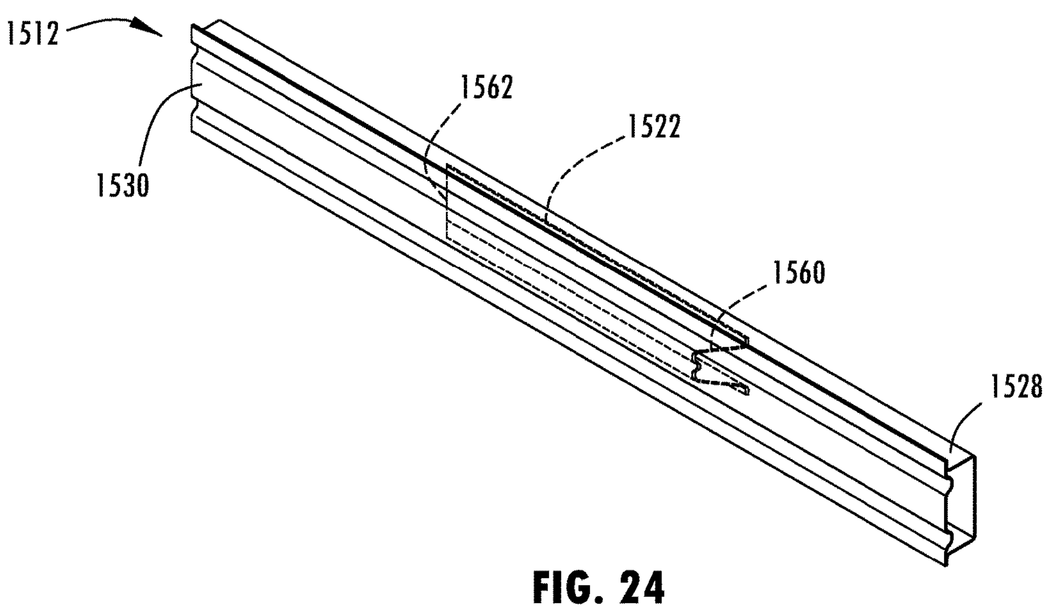
FIG. 24 is a perspective view of an additional example of a reinforcement beam.
Figure 25:
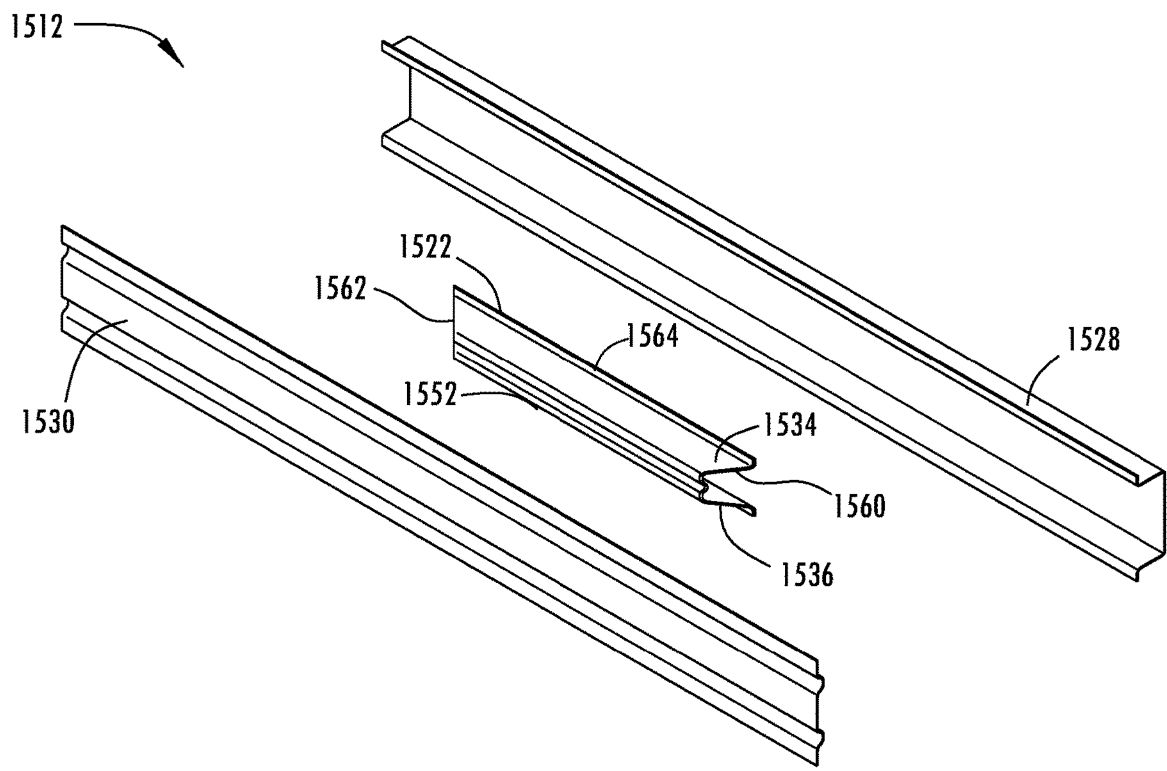
FIG. 25 is an exploded perspective view of the reinforcement beam of FIG. 24.
Figure 26:
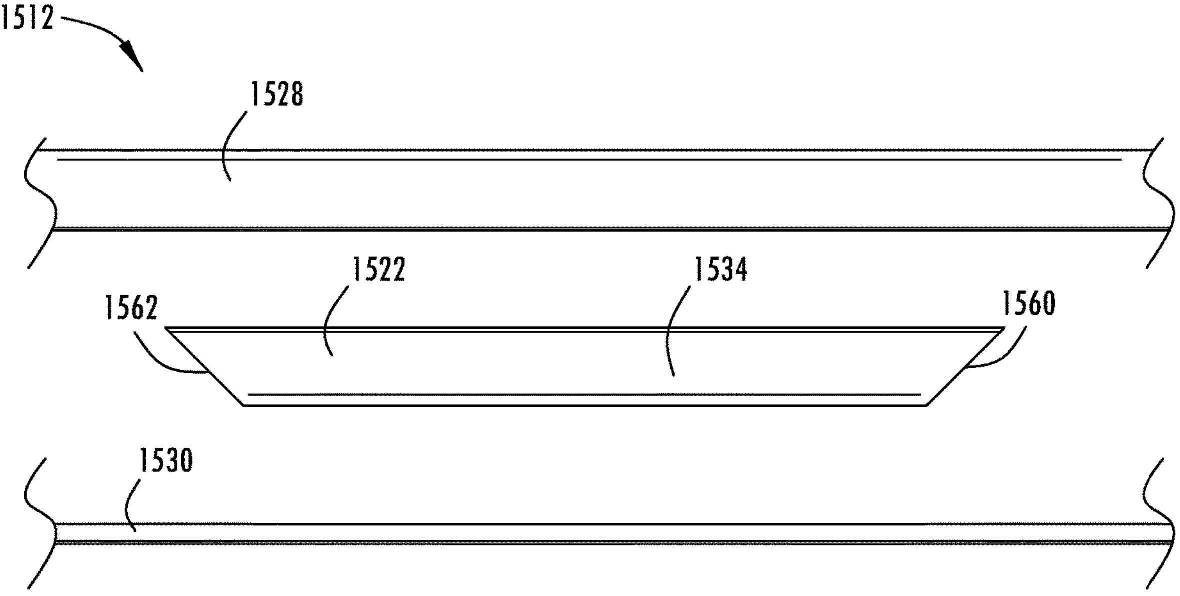
FIG. 26 is an exploded side elevation view of the reinforcement beam of FIG. 24.

Similarly as shown in FIGS. 24-26, the reinforcement beam 1512 includes an inner beam component 1522 that has tapered ends 1560, 1562. The inner beam 1522 includes a front facing side 1452 or intermediate or connecting wall that connects the upper wall 1534 and the lower wall 1536. The front facing side 1552 runs adjacent to and generally parallel to the front wall 1530 of the outer beam. The inner beam 1522 also includes a rear facing side 1564 that generally includes the rear most portion of the upper wall 1534 and the lower wall 1536. The tapered ends 1560, 1562 connect the ends of the front facing side 1552 to the respective ends of the rear facing side 1564 of the inner beam component 1522 defining a tapered shape due to the difference in the length. As shown in FIG. 26, the tapered ends 1560, 1562 are angled at approximately 45 degrees relative to the front wall 1530, such that the front facing side 1552 has a longer length than the rear facing side 1564. The tapered shape of the ends 1560, 1562 may provide a gradual reduction in stress concentration upon impact and a reduction in strength at the ends of the inner beam component 1522. A gradual reduction in strength may provide increased stability along the beam 1512 in undergoing stress and receiving impact loads.

For purposes of this disclosure, the term "coupled" (in all of its forms, couple, coupling, coupled, etc.) generally means the joining of two components (mechanical) directly or indirectly to one another. Such joining may be stationary in nature or movable in nature; may be achieved with the two components (mechanical) and any additional intermediate members being integrally formed as a single unitary body with one another or with the two components; and may be permanent in nature or may be removable or releasable in nature, unless otherwise stated.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Furthermore, the terms "first," "second," and the like, as used herein do not denote any order, quantity, or importance, but rather are used to denote element from another.

Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. For example, the terms "approximately," "about," and "substantially" may refer to an amount that is within less than 5% of, within less than 1% of, within less than 0.1% of, and within less than 0.01% of a stated amount.

Further, it should be understood that any directions or reference frames in the preceding description are merely relative directions or movements. For example, the terms "upper," "lower," "right," "left," "rear," "front," "vertical," "horizontal," "inboard," "outboard" and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A bumper reinforcement beam configured to be supported by crush cans at a vehicle frame, the bumper reinforcement beam comprising:

an outer beam having an elongated hollow body formed from a metal sheet material and configured to span laterally between the crush cans, the hollow body having a front wall and a rear wall extending along a length defined between a first end and a second end of the hollow body; and an inner beam disposed along an intermediate section of the outer beam, the inner beam having an upper wall and a lower wall that each extend between the front wall and the rear wall of the outer beam, wherein the front wall or the rear wall of the outer beam comprises a formation in the metal sheet material, wherein the inner beam comprises a flange integrally extending from an end portion of the upper wall or the lower wall, and wherein the flange engages the formation to retain the inner beam relative to the outer beam.

2. The bumper reinforcement beam of claim 1, wherein at least one of the front wall and the rear wall of the outer beam comprises at least one rib that extends along the length of the outer beam.

3. The bumper reinforcement beam of claim 1, wherein the inner beam comprises opposing ends that define a length therebetween that is less than a half of the length of the outer beam.

4. The bumper reinforcement beam of claim 1, wherein the inner beam is formed from a second metal sheet material having a greater thickness than the metal sheet material of the outer beam.

5. The bumper reinforcement beam of claim 1, wherein the inner beam comprises an intermediate portion that interconnects between the upper wall and the lower wall to together define a channel along the inner beam.

6. The bumper reinforcement beam of claim 5, wherein the intermediate portion of the inner beam is coupled to the front wall of the outer beam.

7. The bumper reinforcement beam of claim 1, wherein the inner beam comprises rear flanges integrally extending from a rear portion of the upper and lower walls.

8. The bumper reinforcement beam of claim 7, wherein the rear wall includes a pair of rear ribs configured to retain the rear flanges.

9. The bumper reinforcement beam of claim 1, wherein the outer beam comprises a front piece that comprises the front wall and a rear piece that comprises the rear wall, wherein the front and rear pieces each include upper and lower flanges, and wherein the front and rear pieces are attached together along the respective upper and lower flanges to enclose a hollow interior of the outer beam.

10. A bumper reinforcement beam configured to be supported by crush cans at a vehicle frame, the bumper reinforcement beam comprising:

a front beam piece comprising a front wall;

a rear beam piece comprising a rear wall and upper and lower flanges that are attached along respective upper and lower edges of the front beam piece to define an elongated hollow body having a length configured to span between crush cans; and an inner beam piece attached between the front and rear beam pieces and comprising an upper wall and a lower wall that each extend between the front wall and the rear wall, wherein the inner beam piece has a length that is less than half the length of the elongated hollow body, wherein the front wall or the rear wall comprises a formation, wherein the inner beam piece comprises a flange integrally extending from the upper wall or the lower wall, and wherein the flange engages the formation to retain the inner beam in the elongated hollow body.

11. The bumper reinforcement beam of claim 10, wherein the upper and lower walls of the inner beam extend rearward at an angle of less than 40 degrees relative to normal to a planar extent of the front wall.

12. The bumper reinforcement beam of claim 11, wherein the upper wall of the inner beam extends rearward and upward at an angle of less than 20 degrees relative to normal to a planar extent of the front wall.

13. The bumper reinforcement beam of claim 11, wherein the lower wall of the inner beam extends rearward and downward at an angle of less than 20 degrees relative to normal to a planar extent of the front wall.

14. The bumper reinforcement beam of claim 10, wherein the front beam piece and the rear beam piece are attached together along respective upper and lower flanges, and the front and rear beam pieces are each formed from a separate metal sheet.

15. The bumper reinforcement beam of claim 14, wherein the upper flanges of the front and rear beam pieces protrude upward from a hollow interior of the hollow body.

16. The bumper reinforcement beam of claim 14, wherein the lower flanges of the front and rear beam pieces protrude downward from the hollow interior of the hollow body.

17. The bumper reinforcement beam of claim 10, wherein the rear beam piece comprises an upper wall and a lower wall that together with the rear wall define a C-shaped cross section.

18. The bumper reinforcement beam of claim 10, wherein the rear wall of the rear beam piece comprises an attachment surface that is adapted for attachment to the crush cans.

19. A bumper reinforcement beam for a vehicle, the bumper reinforcement beam comprising:

an outboard beam component comprising an outboard wall;

an inboard beam component comprising an inboard wall and upper and lower flanges that are attached along respective upper and lower edges of the outboard beam component to define an elongated hollow body with a length defined between opposing ends of the outboard beam component; and an inner beam component attached between the outboard and inboard beam components and comprising a C-shaped cross section defining an upper shear wall and a lower shear wall that each extend between the outboard wall and inboard wall, wherein the inner beam component has a length that is less than half the length of the elongated hollow body, wherein the outboard wall or the inboard wall comprises a formation, wherein the inner beam comprises a flange integrally extending from an end portion of the upper shear wall or the lower shear wall, and wherein the flange engages the formation to retain the inner beam in the elongated hollow body.

20. The bumper reinforcement beam of claim 19, wherein the upper and lower shear walls of the inner beam divide an interior volume of the hollow body to form a plurality of elongated hollow areas.

21. The bumper reinforcement beam of claim 19, wherein the inner beam component comprises a first length attached to the outboard beam component and comprises a second length attached to the inboard beam component.

22. The bumper reinforcement beam of claim 21, wherein the inner beam component comprises a tapered end that connects an end of the first length to an end of the second length.

* * * * *